United States Patent [19]
Tai

[11] Patent Number: 5,606,649
[45] Date of Patent: Feb. 25, 1997

[54] METHOD OF ENCODING A DOCUMENT WITH TEXT CHARACTERS, AND METHOD OF SENDING A DOCUMENT WITH TEXT CHARACTERS FROM A TRANSMITTING COMPUTER SYSTEM TO A RECEIVING COMPUTER SYSTEM

[75] Inventor: Kuang-Cheng Tai, Taipei Hsien, Taiwan

[73] Assignee: Dynalab, Inc., Taipei, Taiwan

[21] Appl. No.: 525,908

[22] Filed: Sep. 8, 1995

[51] Int. Cl.$^6$ .................................................. C06K 15/00
[52] U.S. Cl. ........................................ 395/110; 395/115
[58] Field of Search .................................. 395/110, 114, 395/200.02, 101, 200.03–200.09, 150, 151, 112, 115, 200.01; 345/141, 145, 192, 193, 194, 195; 400/61, 62, 171, 172, 76, 63, 67, 69, 70–73

[56] References Cited

U.S. PATENT DOCUMENTS

| | | | |
|---|---|---|---|
| 4,686,525 | 8/1987 | Nagata | 395/110 |
| 5,119,471 | 6/1992 | Kagaya et al. | 395/110 |
| 5,345,548 | 9/1994 | Nomura et al. | 395/150 |

FOREIGN PATENT DOCUMENTS 61-147288  7/1986  Japan.

*Primary Examiner*—Arthur G. Evans
*Attorney, Agent, or Firm*—Christensen O'Connor Johnson & Kindness PLLC

[57] ABSTRACT

A method of encoding a document with text characters includes the steps of providing a font memory with a first memory region for storing a plurality of basic unit information and a second memory region for storing a plurality of character information, and selecting a text character of the document. If the character information corresponding to the selected text character is found in the font memory, a corresponding user-defined code is assigned to the selected text character, and the corresponding user-defined code is stored in a character information region of a font file. The character information corresponding to the selected text character is stored in the character information region of the font file, and the basic unit information of the constituting basic units that constitute the selected text character is stored in a basic unit information region of the font file. If the character information corresponding to the selected text character is not found in the font memory, a corresponding user-defined code is assigned to the selected text character and is stored in the character information region of the font file, and outline data of the selected text character is generated and stored as character information of the selected text character in the font file.

22 Claims, 3 Drawing Sheets

| | | | | | |
|---|---|---|---|---|---|
| ID-0 | OD-0 | | | | |
| ID-1 | OD-1 | | | | |
| ID-2 | OD-2 | | | | |
| ⋮ | ⋮ | | | | |
| SD-1 | ID-2 | Xn,Yn | Sx,Sy | θ | |
| | ID-1 | Xn,Yn | Sx,Sy | θ | |
| | ID-4 | Xn,Yn | Sn,Sy | θ | |
| | ⋮ | ⋮ | ⋮ | ⋮ | |
| SD-2 | ID-N | Xn,Yn | Sx,Sy | θ | |
| | ⋮ | ⋮ | ⋮ | ⋮ | |

| ID-a | OD-a | | | |
|------|------|---|---|---|
| ID-b | OD-b | | | |
| ID-c | OD-c | | | |
| . | . | | | |
| . | . | | | |
| . | . | | | |
| . | . | | | |
| UD-1 | ID-b | Xn,Yn | Sx,Sy | θ |
| ID-c | Xn,Yn | Sx,Sy | θ | ID-d |
| ...... | UD-2 | ID-a | Xn,Yn | Sx,sy |
| θ | ...... | UD-1 | UD-3 | ID-e |
| ...... | | | | |
| | | | | |
| | | | | |
| | | | | |
| | | | | |
| | | | | ........ |

21 (top section), 23 (middle section)

```
SET FONT SIZE,  ....
SET FONT TYPE, .....
SET FONT ATTRIBUTE .....
SET CHARACTER POSITION .....
UD-N, ......
---------------------------------
SET FONT SIZE, ......
SET FONT TYPE, ......
SET FONT ATTRIBUTE .....
SET CHARACTER ......
UD-1, .....
```

25

F I G. 3

METHOD OF ENCODING A DOCUMENT WITH TEXT CHARACTERS, AND METHOD OF SENDING A DOCUMENT WITH TEXT CHARACTERS FROM A TRANSMITTING COMPUTER SYSTEM TO A RECEIVING COMPUTER SYSTEM

BACKGROUND OF THE INVENTION

1. Field of the Invention

The invention relates to a method of encoding a document with text characters and to a method of sending a document with text characters from a transmitting computer system to a receiving computer system.

2. Description of the Related Art

Presently, transmission of a document is achieved by encoding the document through the use of standard codes or by converting the document into image data. In the former, the standard code to be used depends upon the language of document. For example, English documents use the ASCII or EBCDIC code, while Japanese documents use the JIS code. As for Chinese documents, the CNS BIG-5 code is used in Taiwan, while the GB code is used in Mainland China. A main drawback encountered when using standard codes in the transmission of documents is that the receiving computer system is usually incapable of reconstructing documents in some languages since it is seldom provided with the capability decode all of the standard codes that are currently use throughout the world. Transmission of a document by converting the same into image data is usually achieved with the aid of digital scanners. The resulting image data, however, requires a relatively large memory space for storage and a longer transmission time.

SUMMARY OF THE INVENTION

Therefore, the object of the present invention is to provide a method of encoding a document with text characters and to a method of sending a document with text characters from a transmitting computer system to a receiving computer system which are capable of overcoming the aforementioned drawbacks that are commonly associated with the prior art.

More specifically, the object of the present invention is to provide a method of encoding a document with text characters which can enable a receiving computer system to properly reconstruct a document sent by a transmitting computer system regardless of the language of the document. Since the present invention does not require conversion of the text characters of a document into image data, the document which is encoded according to the present invention requires a relatively small memory space for storage and a relatively short transmission time.

According to one aspect of the present invention, a method of encoding a document with text characters comprises the steps of:

(a) providing a font memory with a first memory region for storing a plurality of basic unit information and a second memory region for storing a plurality of character information;

(b) selecting a text character of the document;

(c) if the character information corresponding to the selected text character is found in the font memory:

(c1) assigning a corresponding user-defined code to the selected text character, and storing the corresponding user-defined code in a character information region of a font file;

(c2) storing the character information corresponding to the selected text character in the character information region of the font file; and (c3) storing the basic unit information of the constituting basic units that constitute the selected text character in a basic unit information region of the font file; and (d) repeating steps (b) and (c) for succeeding ones of the text characters of the document until the character information of all of the text characters of the document have been stored in the font file.

If the character information corresponding to the selected text character is not found in the font memory, a corresponding user-defined code is assigned to the selected text character, and the corresponding user-defined code is stored in the character information region of the font file. Outline data of the selected text character is then generated and stored as character information of the selected text character in the font file.

Preferably, if the character information of the selected text character has already been stored in the font file, only the corresponding user-defined code of the selected text character is stored in the character information region of the font file to minimize the presence of redundant information in the font file.

According to another aspect of the present invention, a method of sending a document with text characters from a transmitting computer system to a receiving computer system comprises the steps of:

at the transmitting computer system:
(A) encoding the document, including the steps of:
(a) providing a font memory with a first memory region for storing a plurality of basic unit information and a second memory region for storing a plurality of character information;
(b) selecting a text character of the document;
(c) if the character information corresponding to the selected text character is found in the font memory: (c1) assigning a corresponding user-defined code to the selected text character, and storing the corresponding user-defined code in a character information region of a font file; (c2) storing the character information corresponding to the selected text character in the character information region of the font file; and (c3) storing the basic unit information of the constituting basic units that constitute the selected text character in a basic unit information region of the font file; and
(d) repeating steps (b) and (c) for succeeding ones of the text characters of the document until the character information of all of the text characters of the document have been stored in the font file; and
(B) transmitting the font file for reception by the receiving computer system; and at the receiving computer system:
(C) receiving the font file transmitted by the transmitting computer system; and
(D) decoding the font file to reconstruct the document. The reconstructed document may be printed out or displayed at the receiving computer system.

BRIEF DESCRIPTION OF THE DRAWINGS

Other features and advantages of the present invention will become apparent in the following detailed description of the preferred embodiment with reference to the accompanying drawings, of which:

FIG. 2 illustrates the contents of a font memory used in the encoding method of the present invention; and FIG. 3 illustrates a font file that is created in the encoding method of the present invention.

DETAILED DESCRIPTION OF THE PREFERRED EMBODIMENT

Figure 1:
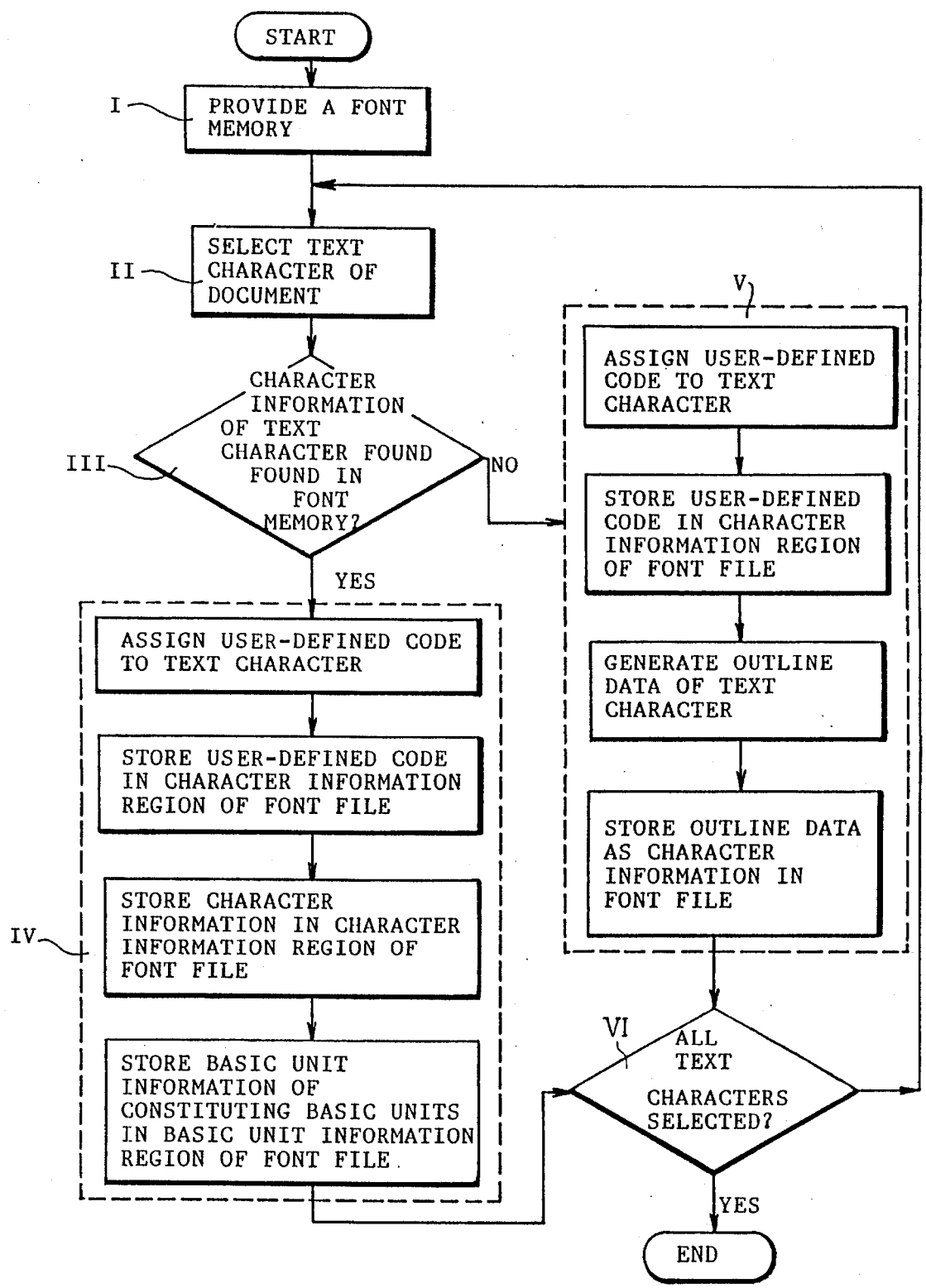
FIG. 1 is a flowchart of the preferred embodiment of a document encoding method according to the present invention.

Japanese Laid-Open Patent Publication No. 61-147288, published on Jul. 4, 1986, discloses a text character pattern generating apparatus for displaying kanji characters on a computer monitor. The pattern generating apparatus has a font memory for providing kanji character data to a central processing unit (CPU). In this publication, a kanji character is constituted by a plurality of basic units. Each basic unit may be a stroke or a set of strokes of the corresponding kanji character. Thus, the font memory used in the pattern generating apparatus contains a plurality of basic unit information and a plurality of character information. Each basic unit information includes an identifying code of a respective basic unit and outline data of the respective basic unit in a predetermined basic unit space. Each character information includes the identifying codes of constituting basic units that constitute a respective character, locations of the constituting basic units in a predetermined character space, and sizes of the constituting basic units in the predetermined character space.

When it is desired to display a kanji character on a computer monitor, the CPU retrieves the character information corresponding to the kanji character from the font memory. The CPU then provides the character information and the outline data of the basic units that constitute the kanji character, along with other information, such as the location of the kanji character, the length of the kanji character in the X and Y directions, the thickness of the kanji character in the X and Y directions, and the color and font of the kanji character, to a graphics controller which then generates a character pattern to be stored in a frame memory. A processor reads the contents of the frame memory and converts the same into display data that is provided to the computer monitor.

In the encoding method of the present invention, a document with text characters, which has been encoded in a standard code by a source computer system, is then encoded in terms of its character structure with the aid of a font memory similar to that employed in the aforementioned Japanese publication. The character-structure encoded document is stored in a font file which is to be sent to a receiving computer system through known data transmission methods, such as by electronic mail.

Referring to FIG. 1, the preferred embodiment of a document encoding method according to the present invention comprises the following steps:

Step I. As illustrated in FIG. 2, a font memory 10 is provided and is shown to have a first memory region 11 for storing a plurality of basic unit information and a second memory region 13 for storing a plurality of character information. Each basic unit information includes identifying code (ID) of a respective basic unit and outline data (OD) of the respective basic unit in a predetermined basic unit space. The outline data may be Bezier curve data, spline curve data or vector data. Each character information includes the standard code (SD) of a respective character, the identifying codes (ID) of constituting basic units that constitute the respective character, locations of the constituting basic units in a predetermined character space, sizes of the constituting basic units in the predetermined character space, and orientations (Θ) of the constituting basic units in the predetermined character space. The locations of the constituting basic units in the predetermined character space are defined by shift data (Xn, Yn) in the X and Y-axes. The sizes of the constituting basic units in the predetermined character space are defined by scaling factors (Sx, Sy) in the X and Y-axes.

Step II. A text character of a document to be encoded is then selected.

Step III. It is then determined whether the character information corresponding to the selected text character can be found in the font memory 10. In the preferred embodiment, this is accomplished by comparing the standard code assigned to the selected text character with the standard codes (SD) stored in the font memory 10.

Step IV. If the character information corresponding to the selected text character is found in the font memory 10, a corresponding user-defined code is assigned to the selected text character, and the corresponding user-defined code is stored in a font file. As shown in FIG. 3, the user-defined code (UD) is stored in a character information region 23 of the font file 20. The character information corresponding to the selected text character is subsequently stored in the character information region 23, while the basic unit information of the constituting basic units that constitute the selected text character are stored in a basic unit information region 21 of the font file 20. Preferably, the identifying codes (ID) of the constituting basic units found in the character information region 23 of the font file 20 point to the location of the corresponding basic unit information in the basic unit information region 21.

Step V. If the character information corresponding to the selected text character is not found in the font memory 10, a corresponding user-defined code (UD) is assigned to the selected text character, and the corresponding user-defined code (UD) is stored in the character information region 23 of the font file 20. Outline data of the selected text character is then generated with the use of a known outline generator, such as the FontoGrapher software tool developed by ALTSYS Co., and is subsequently stored as the character information of the selected text character in the font file 20. The outline data can be stored in the character information region 23 of the font file 20 directly after the corresponding user-defined code (UD), or in the basic unit information region 21 of the font file 20. In the latter case, an identifying code (ID) is assigned to the outline data, and the assigned identifying code (ID) and the outline data are stored in the basic unit information region 21. The assigned identifying code (ID) is also stored in the character information region 23 directly after the corresponding user-defined code (UD).

Step VI. Steps II to V are then repeated for succeeding ones of the text characters of the document until the character information of all of the text characters of the document have been stored in the font file 20. In Steps IV and V, if the character information of the selected text character has already been stored in the font file 20, such as when the text character occurs more than once in the document, only the corresponding user-defined code (UD) of the selected text character is stored in the character information region 23 of the font file 20 to minimize the presence of redundant information in the font file 20 and to reduce the required memory space of the latter.

The font file 20 may further have a document description region 25 for storing at least one document description information therein. Each document description information is in the form of a printer page description language, such as PCL/ESCP/POSTSCRIPT, and includes font-related data, such as the font size, the font type, the font attribute and the text character position, and the user-defined codes (UD) of the text characters that are described by the font-related data. Thus, the font file 20 that is created by the encoding method of this invention, when properly decoded, permits accurate reconstruction of the original document even though the text characters in the latter have different sizes and fonts.

The encoding method of this invention may be used to encode documents which only have text characters or which have both text and image portions. In the latter type of document, digital data which is used to conventionally represent the image portion of the document may be stored in an image region of the font file.

The font file 20 resulting from the encoding method of the present invention may be stored in a portable data storage medium, such as a floppy disk. Alternatively, the font file 20 may be sent to a receiving computer system via electronic mail. In either case, the computer system must be capable of decoding the font file 20 to permit reconstruction of the original document.

Since the font file 20 does not contain any standard code, another computer system can properly reconstruct the original document from the font file 20 regardless of the language of the document. In addition, since the font file 20 does not contain image data of the text characters of the document, the font file 20 requires a relatively small memory space for storage and a relatively short transmission time.

The encoding method of the present invention may be implemented in a printer driver routine of an operating system. Thus, the encoding method can be executed by running a Print-to-File command. Alternatively, a dedicated hardware device may be designed to create the font file 20 in accordance with the encoding method of the present invention.

As mentioned beforehand, the font file 20 must be decoded in order to reconstruct the original document on another computer system. During the decoding operation, a reconstructing module (not shown) receives the contents of the font file 20 and reconstructs the text characters of the document therefrom. The reconstructing module operates in a reverse sequence of the encoding method. Based on the character information in the font file 20, the outline data of the constituting basic units are retrieved to obtain a corresponding character pattern. In accordance with the document description information in the font file 20, the text character may be accurately reconstructed for viewing on a computer monitor or for printing.

As with the encoding method of the present invention, the reconstructing module may be implemented as an applications program of an operating system or as a dedicated hardware device. In either case, the reconstructing module may be incorporated in a computer printer to permit accurate reproduction of the original document.

It should be noted that a computer system may be capable of performing both the encoding and decoding operations of the present invention. Alternatively, the encoding and decoding operations may be performed on separate computer systems. In the latter case, in the event that the separate computer systems have different operating systems, reconstruction of the original document is possible as long as the method of the present invention is in use.

It has thus been shown that the encoding method of the present invention can enable a receiving computer system to properly reconstruct a document sent by a transmitting computer system regardless of the language of the document. In addition, since the present invention does not require conversion of the text characters of a document into image data, the document which is encoded according to the present invention requires a relatively small memory space for storage and a relatively short transmission time. The objective of the present invention is thus met.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A method of encoding a document with text characters, comprising the steps of:

(a) providing a font memory with a first memory region for storing a plurality of basic unit information and a second memory region for storing a plurality of character information;

(b) selecting a text character of the document;

(c) if it is determined that the character information corresponding to the selected text character is found in the font memory:

(c1) assigning a corresponding user-defined code to the selected text character, and storing the corresponding user-defined code in a character information region of a font file;

(c2) storing the character information corresponding to the selected text character in the character information region of the font file; and (c3) storing the basic unit information of the constituting basic units that constitute the selected text character in a basic unit information region of the font file; and (d) repeating steps (b) and (c) for succeeding ones of the text characters of the document until the character information of all of the text characters of the document have been stored in the font file.

2. The method as claimed in claim 1, further comprising the steps of:

between steps (b) and (d), if the character information corresponding to the selected text character is not found in the font memory: assigning a corresponding user-defined code to the selected text character, and storing the corresponding user-defined code in the character information region of the font file; and generating outline data of the selected text character, and storing the outline data as character information of the selected text character in the font file.

3. The method as claimed in claim 1, further comprising the steps of:

after step (b), if the character information of the selected text character has been stored in the font file, storing only the corresponding user-defined code of the selected text character in the character information region of the font file, and selecting the succeeding one of the text characters of the document.

4. The method as claimed in claim 1, wherein the second memory region of the font memory further has standard codes of characters defined by the character information stored therein, the standard code assigned to the selected text character being compared with the standard codes stored in the font memory to determine whether the character information corresponding to the selected text character can be found in the font memory.

5. The method as claimed in claim 1, wherein each of the basic unit information includes identifying code of a respective basic unit and outline data of the respective basic unit in a predetermined basic unit space, and each of the character information includes the identifying codes of constituting basic units that constitute a respective character, locations of the constituting basic units in a predetermined character space, and sizes of the constituting basic units in the predetermined character space.

6. The method as claimed in claim 5, wherein the locations of the constituting basic units in the predetermined character space are defined by shift data in the X and Y-axes.

7. The method as claimed in claim 5, wherein the sizes of the constituting basic units in the predetermined character space are defined by scaling factors in the X and Y-axes.

8. The method as claimed in claim 5, wherein each of the character information further includes orientations of the constituting basic units in the predetermined character space.

9. The method as claimed in claim 1, further comprising the step of:
    after step (d), storing the font file in a portable data storage medium.

10. The method as claimed in claim 1, further comprising the step of storing document description information in a document description region of the font file, the document description information including font-related data and the user-defined codes of the text characters that are described by the font-related data, the font-related data including font size, font type, font attribute and text character position.

11. A method of sending a document with text characters from a transmitting computer system to a receiving computer system, comprising the steps of:
    at the transmitting computer system:
        (A) encoding the document, including the steps of:
            (a) providing a font memory with a first memory region for storing a plurality of basic unit information and a second memory region for storing a plurality of character information;
            (b) selecting a text character of the document;
            (c) if it is determined that the character information corresponding to the selected text character is found in the font memory: (c1) assigning a corresponding user-defined code to the selected text character, and storing the corresponding user-defined code in a character information region or a font file; (c2) storing the character information corresponding to the selected text character in the character information region of the font file; and (c3) storing the basic unit information of the constituting basic units that constitute the selected text character in a basic unit information region of the font file; and
            (d) repeating steps (b) and (c) for succeeding ones of the text characters of the document until the character information of all of the text characters of the document have been stored in the font file; and
        (B) transmitting the font file for reception by the receiving computer system; and at the receiving computer system:
            (C) receiving the font file transmitted by the transmitting computer system; and
            (D) decoding the font file to reconstruct the document.

12. The method as claimed in claim 11, wherein, at the transmitting computer system, the step (A) further comprises the sub-steps of:
    between sub-steps (b) and (d), if the character information corresponding to the selected text character is not found in the font memory: assigning a corresponding user-defined code to the selected text character, and storing the corresponding user-defined code in the character information region of the font file; and generating outline data of the selected text character, and storing the outline data as character information of the selected text character in the font file.

13. The method as claimed in claim 11, further comprising the step of printing the reconstructed document at the receiving computer system.

14. The method as claimed in claim 11, further comprising the step of displaying the reconstructed document at the receiving computer system.

15. The method as claimed in claim 11, further comprising the step of storing the font file in a portable data storage medium prior to step (B) at the transmitting computer system.

16. The method as claimed in claim 11, further comprising the steps of:
    at the transmitting computer system:
        after sub-step (b), if the character information of the selected text character has been stored in the font file, storing only the corresponding user-defined code of the selected text character in the character information region of the font file, and selecting the succeeding one of the text characters of the document.

17. The method as claimed in claim 11, wherein the second memory region of the font memory further has standard codes of characters defined by the character information stored therein, the standard code assigned to the selected text character being compared with the standard codes stored in the font memory to determine whether the character information corresponding to the selected text character can be found in the font memory.

18. The method as claimed in claim 11, wherein each of the basic unit information includes identifying code of a respective basic unit and outline data of the respective basic unit in a predetermined basic unit space, and each of the character information includes the identifying codes of constituting basic units that constitute a respective character, locations of the constituting basic units in a predetermined character space, and sizes of the constituting basic units in the predetermined character space.

19. The method as claimed in claim 18, wherein the locations of the constituting basic units in the predetermined character space are defined by shift data in the X and Y-axes.

20. The method as claimed in claim 18, wherein the sizes of the constituting basic units in the predetermined character space are defined by scaling factors in the X and Y-axes.

21. The method as claimed in claim 18, wherein each of the character information further includes orientations of the constituting basic units in the predetermined character space.

22. The method as claimed in claim 11, further comprising the step of:
    at the transmitting computer system, storing document description information in a document description region of the font file, the document description information including font-related data and the user-defined codes of the text characters that are described by the font-related data, the font-related data including font size, font type, font attribute and text character position.

* * * * *